US012663189B2

(12) United States Patent
Enslin et al.

(10) Patent No.: US 12,663,189 B2
(45) Date of Patent: Jun. 23, 2026

(54) RENEWABLE POWER AND/OR WATER GENERATOR

(71) Applicant: CIRRUS REHOS RENEWABLE POWER AND WATER (PTY) LTD, Johannesburg (ZA)

(72) Inventors: Johan Adam Enslin, Johannesburg (ZA); Mike Murray, Johannesburg (ZA)

(73) Assignee: CIRRUS REHOS RENEWABLE POWER AND WATER (PTY) LTD, Johannesburg (ZA)

( * ) Notice: Subject to any disclaimer, the term of this patent is extended or adjusted under 35 U.S.C. 154(b) by 102 days.

(21) Appl. No.: 18/550,372

(22) PCT Filed: Dec. 9, 2022

(86) PCT No.: PCT/IB2022/061972
§ 371 (c)(1),
(2) Date: Sep. 13, 2023

(87) PCT Pub. No.: WO2023/105476
PCT Pub. Date: Jun. 15, 2023

(65) Prior Publication Data
US 2024/0295349 A1     Sep. 5, 2024

(30) Foreign Application Priority Data
Dec. 9, 2021    (ZA) ............................ ZA 2021/10181

(51) Int. Cl.
*F25B 15/04* (2006.01)
*B01D 3/00* (2006.01)
(Continued)

(52) U.S. Cl.
CPC .............. *F25B 15/04* (2013.01); *B01D 3/007* (2013.01); *B01D 3/08* (2013.01); *E03B 3/28* (2013.01); *F25B 37/00* (2013.01); *F25B 2400/14* (2013.01)

(58) Field of Classification Search
CPC ...... F25B 15/04; F25B 37/00; F25B 2400/14; F25B 1/053; F25B 15/004; F25B 30/04;
(Continued)

(56) References Cited

U.S. PATENT DOCUMENTS 5,149,446 A * 9/1992 Reidy ........................ E03B 3/28
62/93
5,203,989 A * 4/1993 Reidy ........................ C02F 1/18
62/93
(Continued)

FOREIGN PATENT DOCUMENTS

WO     2015034418 A1     3/2015
WO     2018069845 A1     4/2018
WO     2021148965 A1     7/2021

OTHER PUBLICATIONS

International Search Report and Written Opinion from International Application No. PCT/IB2022/061972 mailed Feb. 21, 2023.
(Continued)

*Primary Examiner* — Hoang M Nguyen
(74) *Attorney, Agent, or Firm* — Ballard Spahr LLP

(57)     ABSTRACT

The invention relates to a renewable power and/or water generator with an absorption heat transformer (AHT) providing a heat pump, an Organic Rankine Cycle (ORC) for generating power, and a coupling between the AHT and the ORC to regenerate ORC rejection heat. The AHT consists of a low pressure evaporator and a vapour absorption binary (VAB) reactor that forms the coupling between the AHT and ORC. The VAB reactor includes an absorption section with
(Continued)

an absorber heat exchanger and a distillation section provided by a rotating centrifugal unit that includes a flooded rotating packed bed.

17 Claims, 8 Drawing Sheets

(51) Int. Cl.
    *B01D 3/08* (2006.01)
    *E03B 3/28* (2006.01)
    *F25B 37/00* (2006.01)
(58) Field of Classification Search
    CPC ......... F25B 15/008; B01D 3/007; B01D 3/08;
        B01D 1/28; B01D 5/0042; B01D 5/00;
            B01D 5/0003; B01D 5/0024; B01D
        5/0039; B01D 5/0075; E03B 3/28; C02F
            2303/10; C02F 1/04; C02F 1/16
    See application file for complete search history.

(56) References Cited

U.S. PATENT DOCUMENTS

| | | | | |
|---|---|---|---|---|
| 2009/0293724 | A1* | 12/2009 | Ivison | E03B 3/28 |
| | | | | 55/421 |
| 2010/0156110 | A1 | 6/2010 | Samkhan | |
| 2012/0222437 | A1* | 9/2012 | Merritt | B01D 5/0006 |
| | | | | 62/476 |
| 2021/0215069 | A1 | 7/2021 | Gios | |
| 2023/0052162 | A1* | 2/2023 | Murray | F25B 15/04 |

OTHER PUBLICATIONS

Enslin , "Baseload Power from Waste Heat", Heat Recovery Micro Systems. Energize, Feb. 2018, pp. 15-18.

Enslin , "Clarifying Process Parameters for the REHOS Cycle Concept", Heat Recovery Micro Systems CC, Oct. 2017, pp. 1-18.
Enslin , "Economic Aspects of Utilizing Heat Transformer Technology", Heat Recovery Micro Systems, Feb. 2019, pp. 1-29.
Enslin , "Executive Overview of the REHOS Technology", Heat Recovery Micro Systems, Feb. 2018, pp. 1-7.
Enslin , "Executive Overview of the REHOS Technology—Revised", Heat Recovery Micro Systems, Apr. 2018, pp. 1-8.
Enslin , "Key Principles of the REHOS Cycle", Heat Recovery Micro Systems, Nov. 5, 2018, pp. 1-15.
Enslin , "Rankine Cycle Efficiency Increase by the Regenerative Recovery of Historically Rejected Heat—Revised", Heat Recovery Micro Systems, Oct. 2018, pp. 1-20.
Enslin , "REHOS Cycle at a Glance", Heat Recovery Micro Systems, Sep. 2018, pp. 1-4.
Enslin , "REHOS Cycle Vs. Perpetual-Motion Machine of the 2nd Kind", Heat Recovery Micro Systems, Oct. 10, 2018, pp. 1-6.
Enslin , "REHOS Technology Executive Summary", Heat Recovery Micro Systems, Apr. 2018, pp. 1-6.
Enslin , "Renewable Energy for Baseload Power", Heat Recovery Micro Systems CC, Apr. 2017, pp. 1-13.
Enslin , "The Binary NH3—H2O Bubble Reactor", Heat Recovery Micro Systems CC, Dec. 2017, pp. 1-14.
Enslin , "The Binary NH3—H2O Bubble Reactor—Revised", Heat Recovery Micro Systems CC, Jul. 2018, pp. 1-14.
Enslin , "The Competitive Advantages of REHOS Technology", Heat Recovery Micro Systems, Jan. 2018, pp. 1-12.
Enslin , "The Competitive Advantages of REHOS Technology—Revised", Heat Recovery Micro Systems, Apr. 2018, pp. 1-14.
Enslin , "The Simplified REHOS Cycle", Heat Recovery Micro Systems CC, Aug. 2017, pp. 1-22.
Enslin , "The Syphon Bubble Reactor Heat Transformer as Heatpump in the REHOS Cycle", Heat Recovery Micro Systems, Jul. 2018, pp. 1-25.
Enslin , "The Versatility of a Vortex Bubble Distillation Reactor (VBDR)", REHOS Product Designs, Apr. 2020, pp. 1-22.

* cited by examiner

RENEWABLE POWER AND/OR WATER GENERATOR

FIELD OF THE INVENTION

The invention relates to a renewable power and atmospheric water generator that makes use of a regenerative heat of solution (REHOS) thermodynamic cycle.

BACKGROUND TO THE INVENTION

Conventional atmospheric water generator (AWG) machines employ a de-humidifying concept where atmospheric air is chilled to below the dew point temperature, condensing water from the air in a cold evaporator heat exchanger coil. The chilled air is used as coolant for the cycle heat rejection at a hot condensing heat exchanger coil. A vapour compression (VC) refrigeration unit is coupled between the two coils to complete the cycle of the classical AWG machine. This AWG process is powered by electricity that is mainly used for driving the VC chiller plant. Due to the high cost of electricity, other options of chiller plant have been investigated and a simple form of absorption heat transformer (AHT) was developed for a replacement of the VC chiller plant.

A novel, simplified AHT is employed in the AWG that is described in international application number PCT/IB2021/04031. The AHT is powered by thermal energy (heat) and uses very little electricity, representing a chiller plant solution that reduces the operational costs of AWG systems and therefore the cost of water produced by it. Replacing the conventional VC chiller in the AWG with this simplified AHT presents a significant step towards low-cost water production/extraction from ambient air. The large potential and benefits to be gained from a machine that can use environmental thermal energy to produce water and/or electricity are well known.

OBJECT OF THE INVENTION

It is an object of this invention to provide an energy-optimized generator that draws thermal energy in the form of sensible heat in water and/or air from a local ambient environment and uses a REHOS thermodynamic cycle to produce power and chilled water, which may in turn be used to extract atmospheric water from the air.

SUMMARY OF THE INVENTION

In accordance with the invention there is provided a power and/or water generator comprising:

an absorption heat transformer (AHT) containing a binary liquid-vapour mixture and consisting of a low pressure (LP) evaporator, and a vapour absorption binary (VAB) reactor;

the AHT configured to extract thermal energy from an external heat source and function as a heat pump creating a temperature gradient used to drive an Organic Rankine Cycle (ORC) that employs a high pressure (HP) vapour expansion drive mechanism for generation of power;

the VAB reactor including an absorption section, and a distillation section;

with an absorber heat exchanger (H/E) located inside the absorption section to draw heat from the absorption section;

the distillation section provided by a rotating centrifugal unit for increasing a volatile component concentration of the binary liquid-vapour mixture in a distillate outlet liquid to be used both in:

(a) the LP evaporator, and (b) a working vapour supply assembly for the vapour expansion drive mechanism; the LP evaporator arranged for heat extraction from the external heat source, to receive distillate outlet liquid from the distillation section for conversion to LP evaporator vapour, and to supply the LP evaporator vapour through a first return line from the LP evaporator to the absorption section;

the absorption section generating heat in a vapour absorption process inside the absorption section;

the working vapour supply assembly incorporating the absorber H/E and arranged to use heat from the absorber H/E inside the absorption section for conversion of distillate outlet liquid from the distillation section to heated high pressure (HP) working vapour;

the HP working vapour supplied to the vapour expansion drive mechanism which is coupled to a generator; and LP exhaust vapour from the expansion drive mechanism connected through a second return line to the absorption section of the VAB reactor.

[The VAB reactor provides a regenerative coupling component between the AHT and the ORC combined with an upgrade of low temperature heat to heat at high temperature that is greater than the high pressure operational temperature of the ORC vapour expansion drive mechanism. The second exhaust vapour return line from the expansion drive mechanism is used to reduce the LP evaporator vapour required mass flow by the absorption section of the distillation reactor.]

Further features of the invention provide for the external heat source to be waste heat or [ultra-low grade] ambient temperature heat, preferably taken direct from environmental air or water.

A further feature of the invention provides for the rotating centrifugal unit to include a flooded rotating packed bed (RPB) reactor; and for the rotating centrifugal unit to employ high-gravity (HiGee) process intensification technology.

A further feature of the invention provides for the absorption section and the distillation section to be provided as parts of an integral component in the rotating centrifugal unit with the absorption section provided adjacent a periphery of the rotating centrifugal unit and the absorber H/E provided as a conduit that runs along the absorber section.

A further feature of the invention provides for the conduit of the absorber H/E to be a coil that runs around the distillation section within the absorber section.

A further feature of the invention provides for the rotating centrifugal unit to provide a rotating drive for an integrated pump that displaces the distillate outlet liquid; for the pump to be a pitot-type pump; and for the pitot-type pump to include multiple pitot pipes provided as a multi-stage cascade arrangement.

A further feature of the invention provides for the working vapour supply assembly to comprise a high pressure (HP) supply line for distillate outlet liquid from the distillation section that is pumped through the absorber H/E to provide the HP working vapour supply to the vapour expansion drive mechanism.

[High concentration NH3 binary liquid is pumped directly to flash in a cooling coil of the absorber H/E, removing heat in latent energy form to carry out to the vapour expansion drive mechanism. In this embodiment of the invention, the absorber H/E provides for a combined evaporation function and cooling-no external HP evaporator is required.]

A further feature of the invention provides for a HP working vapour supply line extending from the absorber H/E to the vapour expansion drive mechanism to include a by-pass return with a condenser heat exchanger (H/E) and a connection into the second return line to the absorber section of the VAB reactor.

A further feature of the invention provides for the by-pass return to include a pressure reducing valve.

A further feature of the invention provides for the working vapour supply assembly to comprise:

a supply line for a heat carrier fluid that is pumped through the absorber H/E where it is heated and delivered as heated absorber output heat carrier fluid to a first side of an HP evaporator for passage through a flow path that is isolated from and in thermal communication with a second side of the HP evaporator, and a high pressure supply line for distillate outlet liquid from the distillation section connected to a second side of the HP evaporator for thermal energy extraction from the heat carrier fluid in the flow path and evaporation of the distillate outlet liquid on the second side of the HP evaporator, wherein the HP working vapour is generated in the HP evaporator to provide HP vapour supply to the vapour expansion drive mechanism.

A further feature of the invention provides for the absorber output heat carrier fluid flow path to include a by-pass away from the HP evaporator to provide a decrease in hot mass flow through the HP evaporator [and limit the power generated in the expansion turbine].

A further feature of the invention provides for ambient air to provide the external heat source and be directed over a first side of the LP evaporator that is isolated from and in thermal communication with a second side of the LP evaporator with a low pressure supply line for distillate outlet liquid from the distillation reactor connected to the second side of the LP evaporator for evaporation of the distillate outlet liquid and thermal energy extraction from the ambient air providing an air-chilling heat exchanger (H/E) for extraction of atmospheric water from the ambient air.

A further feature of the invention provides for a heat carrier fluid medium to be connected through a first branch to the LP evaporator with a fluid medium chilling flow path on a first side of the LP evaporator that is isolated from and in thermal communication with a second side of the LP evaporator and a low pressure supply line for distillate outlet liquid from the distillation reactor connected to the second side of the LP evaporator for evaporation of the distillate outlet liquid and thermal energy extraction from the fluid medium in the fluid medium chilling flow path.

A further feature of the invention provides for the fluid medium chilling flow path of the LP evaporator to be connected to an air-chilling heat exchanger (H/E) for extraction of atmospheric water from air.

Further features of the invention provide for the heat carrier fluid medium to be a high density liquid heat carrier, preferably water providing the external heat source.

A further feature of the invention provides for the absorption section to be provided as an absorber unit separate from and in fluid communication with the rotating centrifugal unit and for the absorber H/E to be a conduit that runs within the absorber unit

4 for a hot outlet from a heated periphery of the rotating centrifugal unit to be connected and pumped into the absorber unit; and for an outlet from the absorber unit to be connected to the rotating centrifugal unit, for a cold outlet from the low temperature centre of the rotating centrifugal unit to be connected to:

(a) a second LP evaporator pump which feeds the LP evaporator, and (b) a HP absorber turbine pump which feeds the absorber H/E in the absorber unit, for an outlet from the LP evaporator to be connected to the absorber unit, and for an outlet from the absorber H/E to be connected to the vapour expansion drive mechanism.

A further feature of the invention provides for a first pump to be provided between the hot outlet from the rotating centrifugal unit and the absorber unit.

A further feature of the invention provides for the rotating centrifugal unit to include a hydraulic powered rotating packed bed (RPB) reactor and rotor with hydraulic turbine blades [Francis-type] driven by liquid radial inflow from the first pump via the absorber unit.

A further feature of the invention provides for heated, low volatile component (NH3) concentration binary liquid to be pumped out of the rotating centrifugal unit by the hydraulic turbine blades to feed the absorber unit via the first pump and for the first pump to be a pressure booster pump.

A further feature of the invention provides for pressure added by the first booster pump serves to sub-cool the low volatile component concentration binary liquid providing higher volatile component concentration binary liquid after vapor absorption in the absorber unit.

A further feature of the invention provides for distillate outlet liquid from the rotating centrifugal unit to be supplied through a LP evaporator pump to the LP evaporator and through a turbine pump to the absorber H/E in the absorber unit.

A further feature of the invention provides for the design pressure of the LP evaporator to be slightly higher than an absorber-distillation combination process pressure and for the working vapour supply assembly pressure to be designed to suit the vapour expansion drive mechanism.

Further features of the invention provide for the vapour expansion drive mechanism to be an expansion turbine; or for the vapour expansion drive mechanism to be a positive displacement type expander.

A further feature of the invention provides for the binary liquid-vapour mixture to be an ammonia-water (NH3-H2O) mixture.

Further features of the invention provide for two different pressure levels to be achieved through two different pressure pumps or through one HP pump and a pressure reducing valve to drop the pressure level for the LP evaporator pressure.

BRIEF DESCRIPTION OF THE DRAWINGS

These and other features of the invention will become more apparent from the following description of embodiments, made by way of example only, with reference to the accompanying drawings, in which.

DETAILED DESCRIPTION OF THE INVENTION

Figure 1:
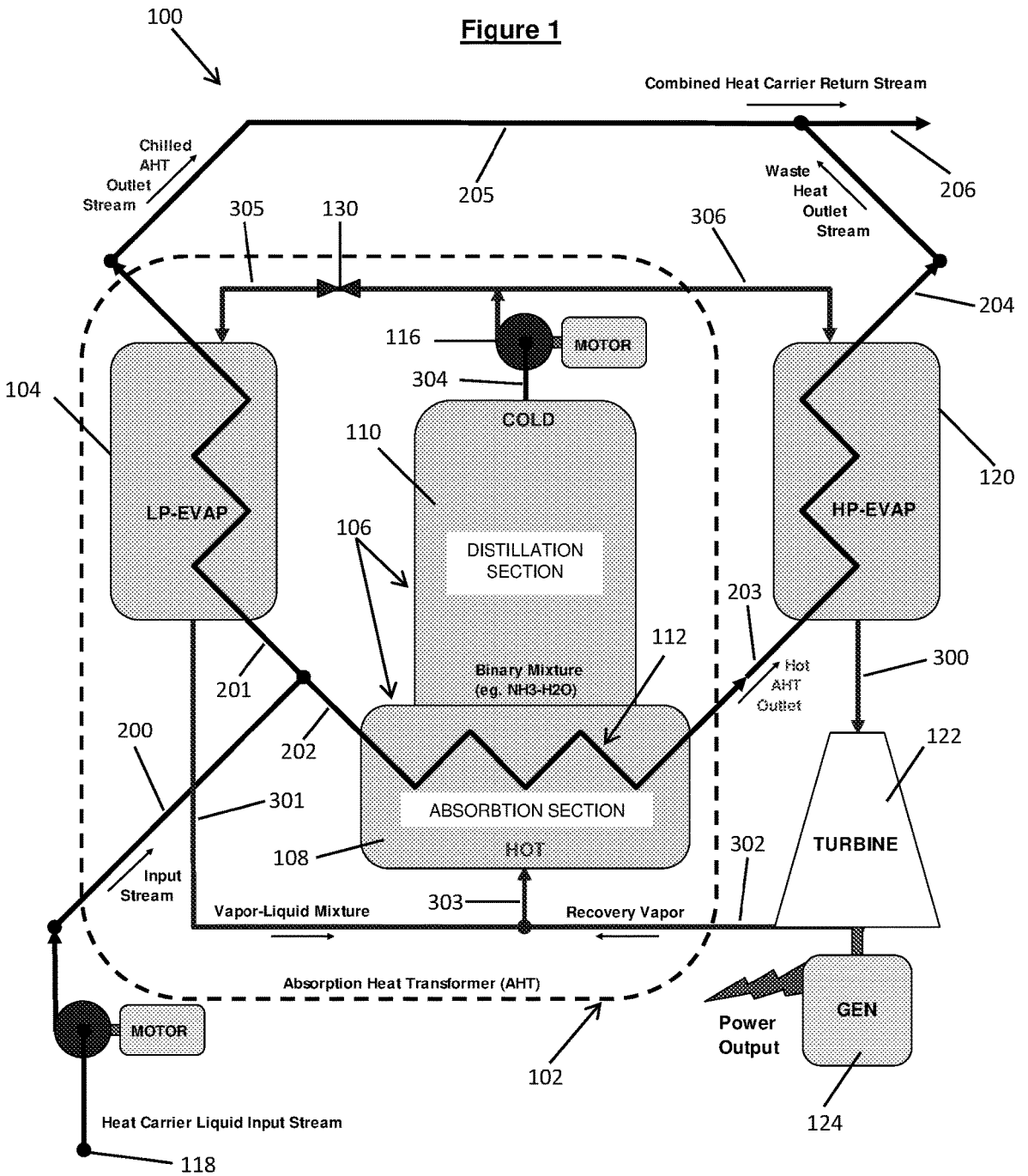
FIG. 1 shows a schematic process layout of a first open cycle water flow generator in accordance with the invention.

A renewable power and/or water generator which employs a regenerative heat of solution (REHOS) cycle is provided in accordance with the invention. More specifically, the invention makes use of an absorption heat transformer (AHT) as a heat pump, an Organic Rankine Cycle (ORC) for generating power, and a coupling between the AHT and the ORC to regenerate ORC rejection heat.

A first embodiment of a renewable power and/or water (RPW) generator (100) with an open cycle water flow operation is described with reference to FIGS. 1 and 2. The AHT (102) consists of a low pressure (LP) evaporator (104) and a vapour absorption binary reactor (VABR or VAB reactor). The VAB reactor (106) forms the coupling between the AHT and ORC to provide the heat regeneration.

The VAB reactor (106) consists of a higher temperature absorption section (108) for a volatile chemical component vapour from the LP evaporator (104) and generates a temperature increase. The absorption section (108) is followed by a distillation section (110) for recouping the volatile component in a higher concentration zeotropic binary liquid mixture. The distillation section is chilled by an endothermic distillation process. An absorber heat exchanger (H/E) (112) is provided in the absorption section.

In the embodiments of this specification, the volatile component is Ammonia (NH3) and the binary liquid mixture is Ammonia-Water (NH3-H2O). Many different refrigerants form zeotropic mixtures that may be used. However, each binary combination would render operation at a different temperature and pressure range, also with very specific conversion efficiencies.

For illustrative purposes, the distillation section (110) of the VAB reactor (106) is shown schematically above the absorption section (108) in FIG. 1. In accordance with the invention, the VAB reactor (106) employs process intensification principles of a relatively small and compact centrifugal unit (114) as shown in the arrangement of FIG. 2.

The centrifugal unit is provided by a high-gravity (HiGee) rotating packed bed (RPB) (114). In this embodiment, the absorption section (108) and the distillation section (110) are provided as parts of an integral component in the centrifugal unit (114). The absorption section (108) is located adjacent a periphery of the centrifugal unit (114) and the absorber H/E is provided as a conduit (112) that runs along the absorber section (108). More specifically, the conduit of the absorber H/E is a coil (112) that runs around the distillation section within the absorber section. A drive pulley (113) is connected to rotate a rotor casing (115) of the centrifugal unit (114) at about 500-1000 RPM in this embodiment.

Figure 3:
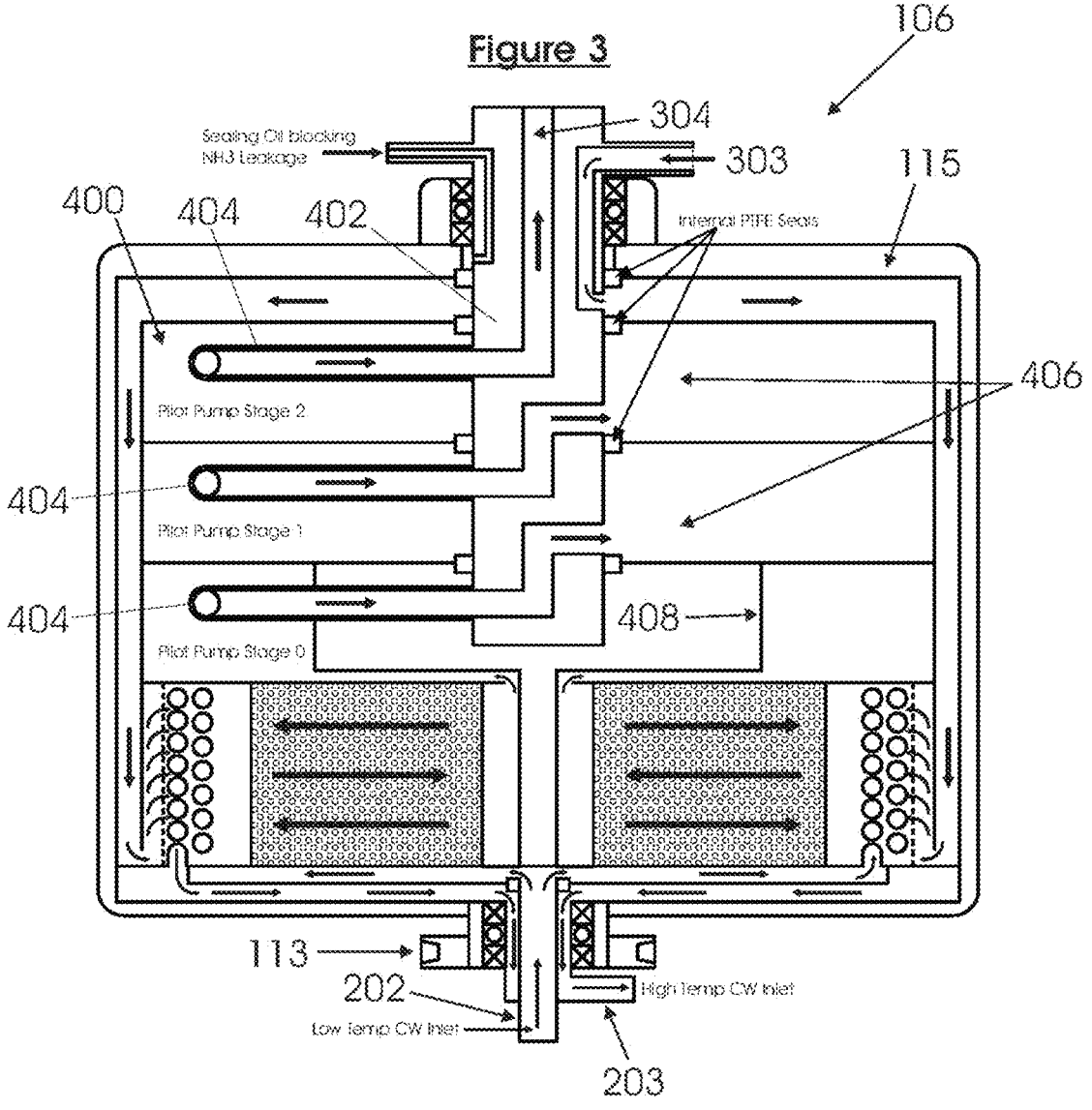
FIG. 3 shows a cross-section through an alternative centrifugal reactor (which uses water as a carrier for heat removal) combined with an internal, multistage pitot-type liquid pump.

The generator (100) includes an external pump (116) separate from the VAB reactor (106) as shown in FIG. 1. [A pump may alternatively be incorporated into the rotating assembly of a centrifugal reactor as shown in FIG. 3. Separate pumps may also be used as part of the process equipment to provide required flow and supply pressure as described and illustrated below.]

In this embodiment, a high density input medium is liquid and will typically be water (but may be replaced with glycol, thermal oil or a similar suitable substance). The water is used as a heat carrier within the generator (100) and a supply of ambient heat from an external source (118). An input liquid stream (200) is split into two as it enters an absorption heat transformer (AHT).

(a) A first portion (201) of the stream traverses the LP evaporator (104), where heat is extracted from the flowing input liquid stream, chilling this stream down to a low temperature. This chilling temperature of the cold stream would typically be 5-10° C., exiting the LP evaporator and therefore, the AHT.

(b) A second portion (202) of the input liquid stream is used as a coolant or cooling water (CW), where it is heated in the passage provided by the absorber cooling coil (112) inside the hot absorption section (108). The heated second portion of the input liquid stream is delivered by the AHT as hot water AHT output stream (203) that may have a temperature lift of typically 20-50° C. above the input stream (202) temperature. A low temperature lift of 20-40° C. renders a high AHT thermodynamic efficiency (the coefficient of performance COP~0.7 or higher), while a higher temperature lift, such as 50-70° C., for example, would have a lower AHT efficiency (COP~0.5-0.6).

(c) The hot water AHT output stream (203) then traverses a high pressure (HP) evaporator (120) where heat is removed from the flowing stream, cooling it down in the process. Because a concentrated binary mixture (high % NH3 distillate) that enters a shell-side of the HP evaporator (120) starts evaporating (flashing) at a low temperature (at or below the ambient input liquid stream temperature) the hot stream (203) may be cooled down even to ambient temperature in the HP evaporator.

(d) A cooled down heat carrier liquid stream (204) leaving the HP evaporator (120) forms a waste heat stream. A chilled water outlet stream (205) leaving the LP evaporator (104) and the waste heat outlet stream leaving the HP evaporator are combined again and form the combined heat carrier return stream (206).

The heat carrier liquid is never in contact with the binary liquid mixture forming the REHOS thermodynamic cycle and is only used to carry heat into and remove heat from the cycle in heat exchanger configurations. The REHOS cycle extracts thermal 30 energy from the heat carrier streams and converts a portion into power. A thermal internal energy of a combined heat carrier return stream (206) is therefore smaller than the thermal internal energy content in the ambient input water stream (200), differing by the nett power output of the REHOS cycle.

HP EVAP to Turbine

In the NH3-H2O cycle of the current embodiment, high pressure NH3 vapour generated in the HP evaporator (120)

is supplied though a feed line (300) and expanded in a power turbo-expander or expansion turbine (122), coupled to a generator (124) to produce power. The low pressure, low temperature turbine exhaust NH3 vapour is fed back through a second return line (302) to the absorption section (108) of the AHT reactor (106), where it is used re-generatively, partially replacing and drastically reducing the NH3 vapour required in a first return line (301) from the LP evaporator (104) and therefore increasing the overall thermal to electrical energy conversion efficiency of the REHOS cycle.

Figure 5:
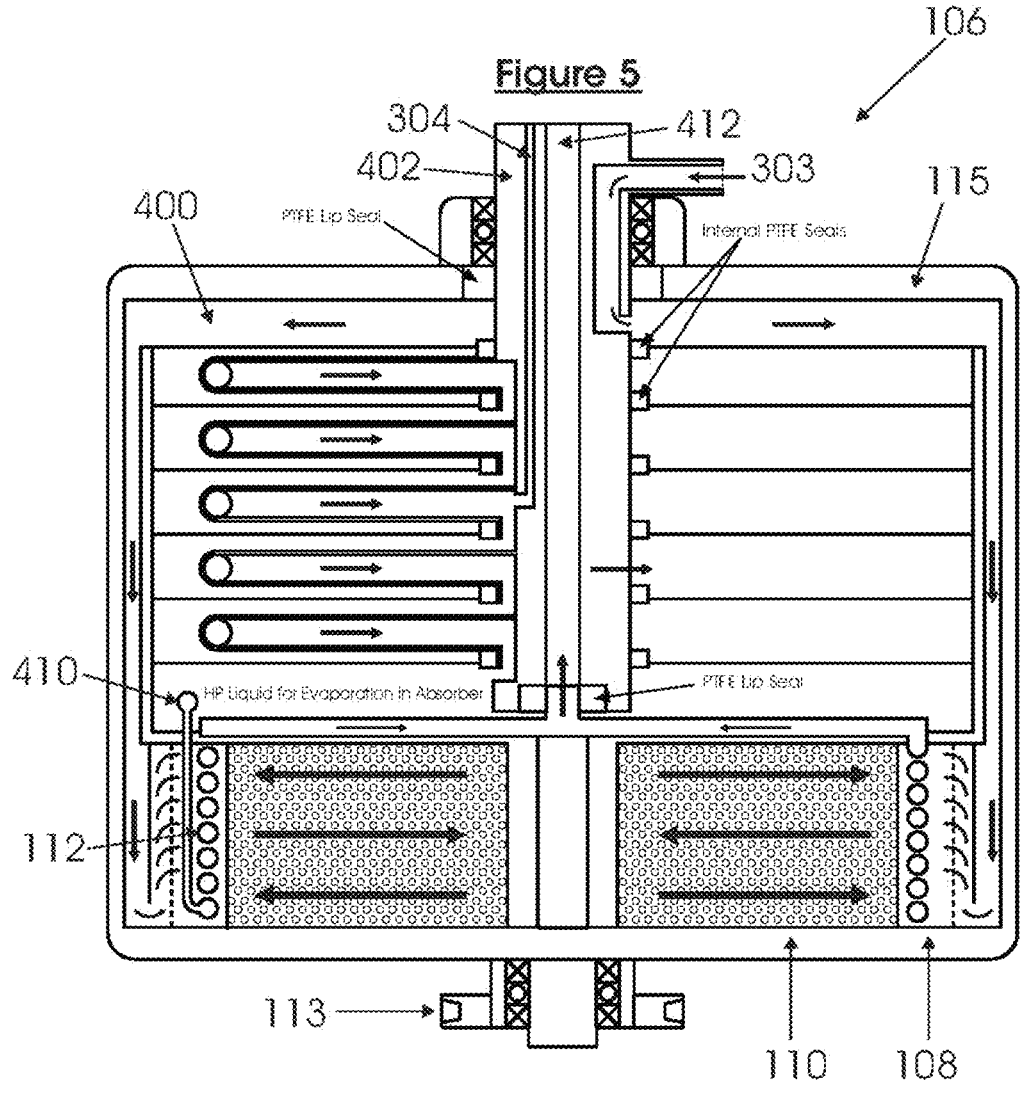
FIG. 5 shows a cross-section through a centrifugal reactor combined with an internal multistage pitot-type liquid pump for use with the process apparatus of FIGS. 6 and 7 (which uses NH3-rich liquid as a carrier for heat removal)

Should the generator (100) only be required to generate sufficient power to drive its own auxiliaries (pumps and fans) but no power is planned to exit the machine, a portion of the hot AHT outlet stream heat carrier liquid may be routed to by-pass the HP evaporator (120), limiting the energy input into the HP evaporator and in turn limiting the turbine vapour mass flow to generate less power. The RPW generator machine used in this manner operates as a true AWG machine, eliminating external electricity requirements to power the water production. A by-pass as referred to is shown in the embodiment of FIG. 5.

Vapour Absorption Binary Reactor

Vapour from the turbine (122) exhaust in the second return line (302) as well as from the LP evaporator (104) in the first return line (301) are combined at input line (303) and enter the hot absorption section (108) at the periphery of the reactor (114). A perforated vapour-liquid plate (126) provides a separation interface around the absorber section. The absorption process generates a significant amount of heat, keeping the absorber temperature high. An excess of this heat needs to be removed by heating the heat carrier liquid stream in the absorber H/E coil (112) forming the hot AHT outlet as described above. A portion (some 10%, for example) of this absorption heat in the absorption section (108) is also used in the VAB reactor (106), powering the NH3 distillation process, which may also be referred to as a volatile component concentration process.

(a) This process involves the density separation of the two components of the binary liquid mixture. In the NH3-H2O binary mixture the vapour entering the absorption section has a very high NH3 (90-99%) content, while the hot liquid mixture in the absorption section has a low NH3 concentration, typically 20%-30% NH3 in aqua. When the NH3 vapour bubbles are absorbed, a localised higher concentration NH3 liquid region is formed with a lower density than the liquid mixture around it.

(b) Density separation under the effect of centrifugal forces in the distillation reactor (114) results in a high % NH3 concentration liquid, for example 80% NH3 at the reactor rotation centre or inner region.

(c) The distillation of the NH3-H2O binary mixture process is also endothermic, absorbing heat as NH3 moves inwards to the reactor centre and therefore the concentrated (high %) NH3 liquid distillate near the centre of the reactor is at a much lower temperature, typically 0° C. or just below zero. It is this concentrated NH3 liquid distillate that enters a binary mixture liquid pump (116) connected to feed the LP evaporator and HP evaporator.

Figure 2:
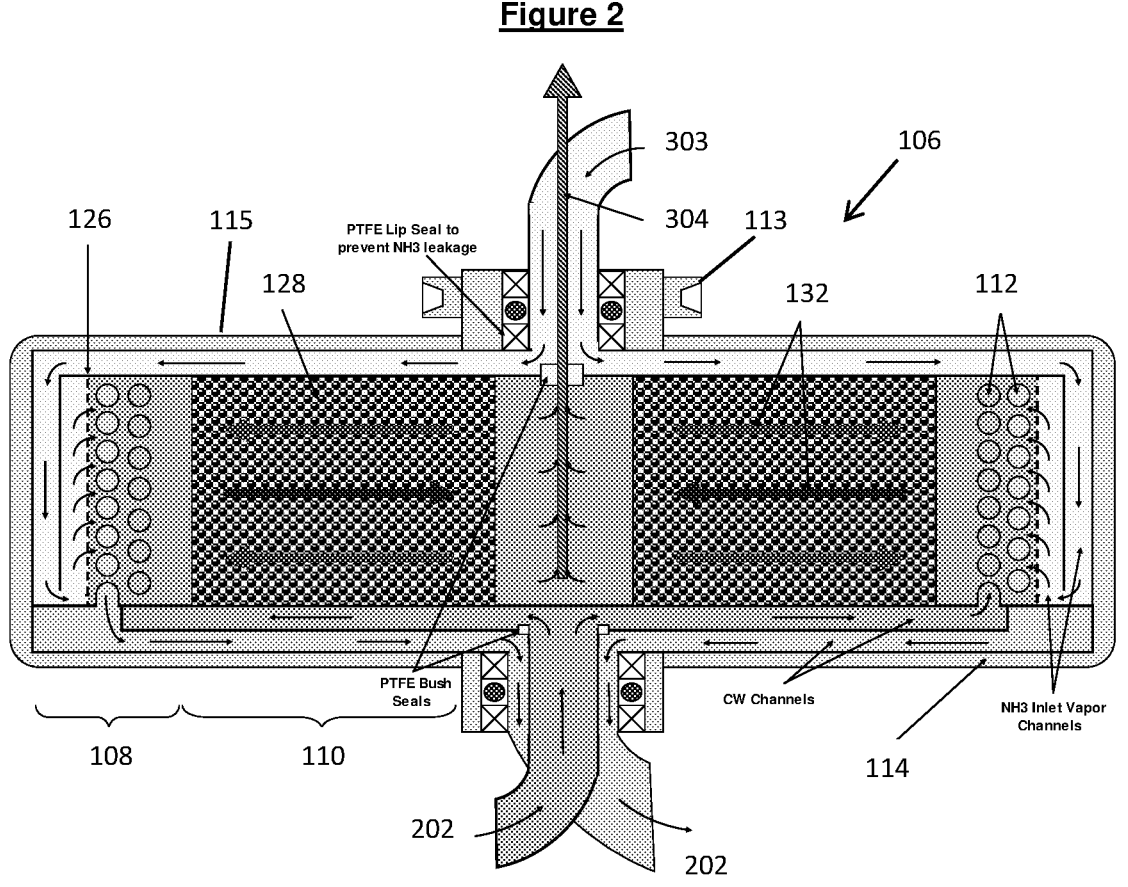
FIG. 2 shows a cross-section through a flooded high-gravity (HiGee) rotating packed bed (RPB) reactor used for the NH3-H2O absorption-distillation in FIG. 1.

In accordance with the VAB reactor (106) of FIG. 2, a high volume reduction ratio (typically 5-10 fold) is obtained using process intensification principles in a high-gravity (HiGee) (several tens to hundreds of gravitational force) rotating packed bed (RPB) operating at a few hundred revolutions per minute (RPM). In addition to improved efficiencies, the illustrated arrangement also serves to provide a compact and small configuration given the heat load involved.

The total mass of the RPB reactor (106) is determined by the packing material (128) and shape used. For example, if small stainless steel balls of 3 mm diameter are used for packing material, the overall generator may render a power to weight ratio of about 7 kg/kWe for a specific configuration, while the same generator using Polytetrafluoroethylene (PTFE) balls of the same size may render a ratio of about 2 kg/kWe. The power to weight ratio is as a result of the density differences between stainless steel and PTFE. The ratio may be substantially reduced by increasing the diameter of the packing balls to a slightly larger diameter, for example 5-6 mm, resulting in a higher reactor H/E capability.

Binary Mixture Liquid Pump

The binary mixture liquid pump (116) receives a high % NH3 distillate through an exit line (304) from the cold reactor centre and is shared between the LP evaporator (104) and HP evaporator (120). The pump output pressure is designed to suit the required pressure of the HP evaporator. A pressure reducing valve (130) is provided in a first supply line (305) to drop the high pump outlet pressure to suit the LP evaporator required pressure and the pump feeds the HP evaporator directly through a second supply line (306).

Design pressure of the LP evaporator (104) is only slightly higher (e.g. 0.5 to 1.5 Bar) than the absorption-distillation combination process pressure, but HP evaporator pressure is designed to suit the turbine, typically 2-4 Bar higher than the LP evaporator pressure.

This higher pressure is also a trade-off, as higher pressure differentials across the turbine (122) render higher turbine isentropic expansion efficiencies. However, a higher design pressure for the HP evaporator pressure allows binary mixture flashing and therefore heat extraction from the hot AHT outlet heat carrying stream only starting from a higher (saturation) temperature, allowing less heat to be extracted in the HP evaporator and consequently higher temperatures of the waste heat stream exiting the HP evaporator, lowering HP mass flow (and power output), rejecting more thermal energy back to the environment.

Pseudo-Isobaric Temperature Gliding

As a result of using a zeotropic binary mixture like NH3-H2O, pseudo-isobaric temperature gliding occurs in all the binary mixture containing components.

The input liquid (heat carrier) stream (200) enters the LP evaporator (104) via (201) at ambient temperature (for example 20° C.) and is cooled down to the chilled outlet heat carrier liquid stream (205) temperature of 1-5° C. (for example). In counter flow to this cooling gradient, the concentrated binary mixture generating the cooling enters the evaporator at a sub-cooled inlet temperature below 0° C., but the LP evaporator pressure is designed to allow saturated binary mixture flashing from just above freezing temperature (0° C.), to avoid chilled water freezing blockages. Evaporation and heat extraction continue on the same temperature gradient (gliding at a constant saturation pressure) as the cooling gradient of the water stream, with the flashed off vapour leaving the LP evaporator at nearly 20° C.

This close approximation of flashing binary mixture temperature to the decreasing water stream temperature maximizes H/E efficiency and minimizes entropy generation in the LP evaporator.

Similarly, isobaric temperature gliding also takes place in the HP evaporator (120), allowing maximum H/E efficiency and a HP vapour temperature entering the turbine (122) of close to the hot AHT outlet heat carrier liquid stream (203) temperature.

In the centrifugal HiGee RPB reactor (106), temperature gliding is also present. Liquid at the outer periphery of the rotating reactor is at a higher temperature (for example 60-80° C.), while the concentrated mixture at the rotation centre remains close to 0° C. Due to centrifugal pressure differences between the outer periphery and the centre of rotation, the process is not truly isobaric, and therefore the naming of "pseudo" isobaric temperature gliding. In FIG. 2, radial counter-flow direct contact heat exchanger flow streams are indicated by the arrows (132), which indicate the heat migration providing the temperature gradient inside the reactor.

The description above details the process of extracting thermal energy from ambient temperature water to power the REHOS cycle and produce a chiller. An assumption is made that the temperature of the ambient water inlet would be (realistically) between 10-40° C., so heat would spontaneously flow from the water traversing the LP evaporator to the saturated binary mixture for use in the REHOS thermodynamic cycle.

At first, just after starting the device, the power developed would be limited by the thermodynamic maximum, or Carnot limitation posed by the actual power cycle (Lorenz cycle) operating between the AHT outlet high temperature and the AHT inlet temperature. For an inlet (ambient) temperature of 20° C. and an AHT temperature lift of 30° C., this would imply that the AHT hot outlet temperature is around 50° C. calculated to a heat-to-power Carnot conversion efficiency of only 9% for this temperature gradient.

Due to the regeneration process utilizing latent heat from the turbine exhaust vapour in the absorber, the thermodynamic overall conversion efficiency for the RPW generator total machine, however, is not dependent on the internal AHT temperature gradient, but is calculated as:

$$\eta_{RRPW-Gen} = \frac{Nett\_Power\_Output}{Heat\_Extracted\_from\_LP - Evaporator}$$

Starting the Generator

When starting the generator machine (100), the vapour generated in the LP evaporator (104) feeds the absorption section (108) in the distillation unit (114) with thermal energy, establishing the design point AHT outlet temperatures. As the HP evaporator (120) starts to generate vapour and production of power by the turbine (122) commences. The low pressure vapour in the turbine exhaust gradually increases to displace the vapour required from the LP evaporator while the heat load in the absorber and distillation reactor remains constant.

This decreasing vapour loading from the LP evaporator (104) gradually decreases the amount of energy extracted from the input heat carrier liquid (and therefore from the environment), thus decreasing the divisor value in the efficiency calculation formula shown above. In short, the power generated stays constant while the vapour absorption heat input remains fixed, but the increasing regeneration from the turbine (122) exhaust vapour gradually decreases the external (environmental) heat required, increasing the overall thermal-to-power conversion efficiency to obtain Nett power output (with pumping and fan power deducted) efficiencies of an estimated 15%-50% in the specific example conditions described. The RPW generator (100) overall power output is not bound by the 9% limitation of its internal temperature gradient.

The high power efficiency of the generator machine (100) also needs no additional heat rejection device, as all heat rejection energy forms part of the regeneration heat load back into the absorption section (108) of the distillation reactor (114).

In the further embodiments described below equivalent parts are generally indicated by the same reference numbers where convenient.

A binary liquid mixture pump may be integrated as part of the RPB reactor by using a multi-stage pitot pump (400) as illustrated in FIG. 3. The pitot pump operation curve is very flat, with little change in isentropic pumping efficiency at a wide range of pumping flow rates. This configuration of VAB reactor (106) and pump combination enables a more compact and practical arrangement of generator (100).

A stationary central shaft (402) is provided to support the pitot tubes (404). In this embodiment, three pitot tubes are arranged to provide three stages of a multi-stage cascade arrangement (406). A liquid ring (408) is provided at the base of the cascade (406). The configuration draws high concentration NH3 liquid from the centre of a distillation section (110). The absorption section (108) and absorber H/E (112) are substantially the same as in FIG. 2.

Figure 4:
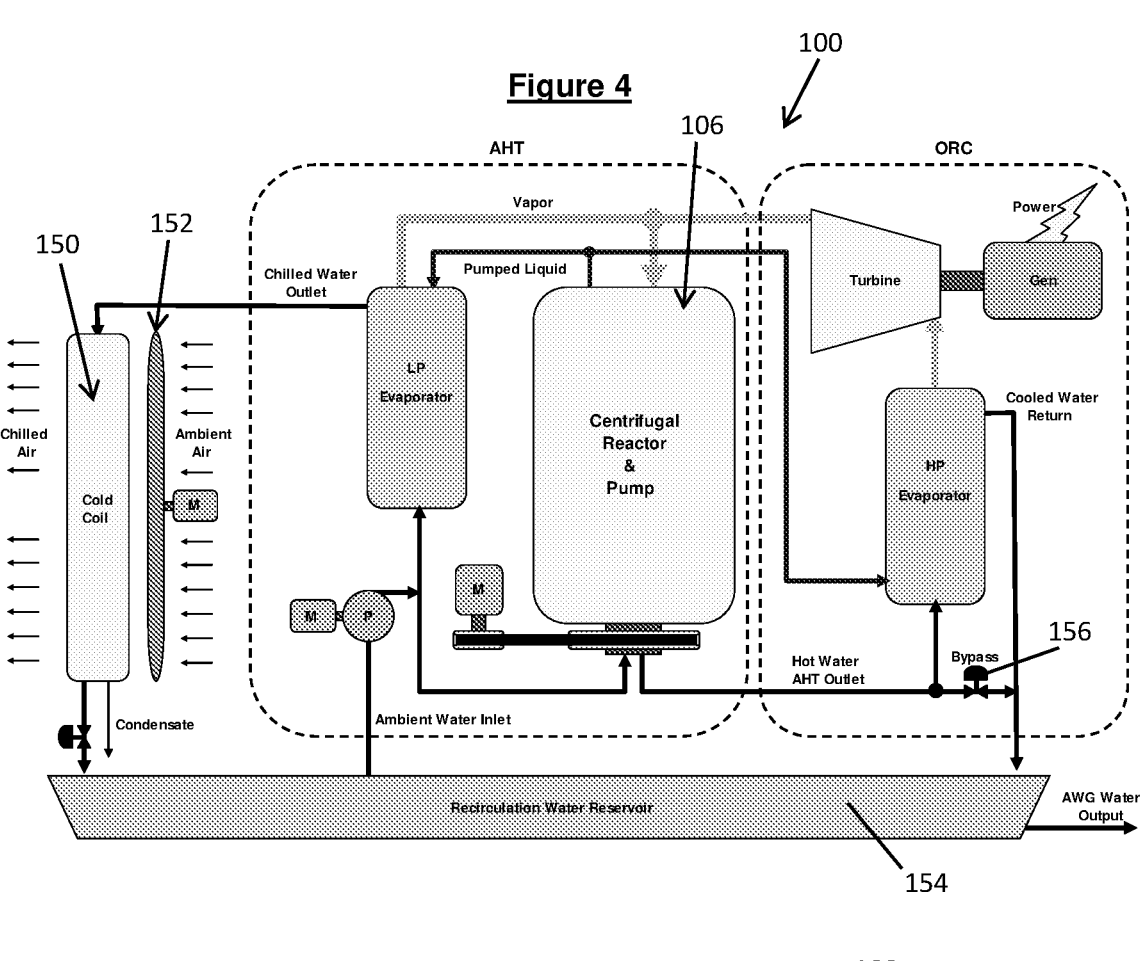
FIG. 4 shows a schematic process layout of a closed cycle air flow generator for producing power and water from air.

In accordance with another aspect of the invention, a closed cycle operation of the renewable power and water generator uses the same process as described above for the REHOS thermodynamic cycle, but the liquid heat carrier streams are closed, recirculating the same liquid, as shown schematically in FIG. 4. The closed cycle machine extracts thermal energy from the ambient air indirectly, with water providing an intermediate medium recirculating heat carrier liquid.

(a) The chilled water outlet exiting the LP evaporator is routed through an air-chilling H/E (150) with a fan (152) forcing ambient temperature humid air to cool down in the air-chilling H/E to below the dew point temperature, condensing the water vapour present in the air. This condensate is then directed to a reservoir (154) as AWG water product.

Figure 6:
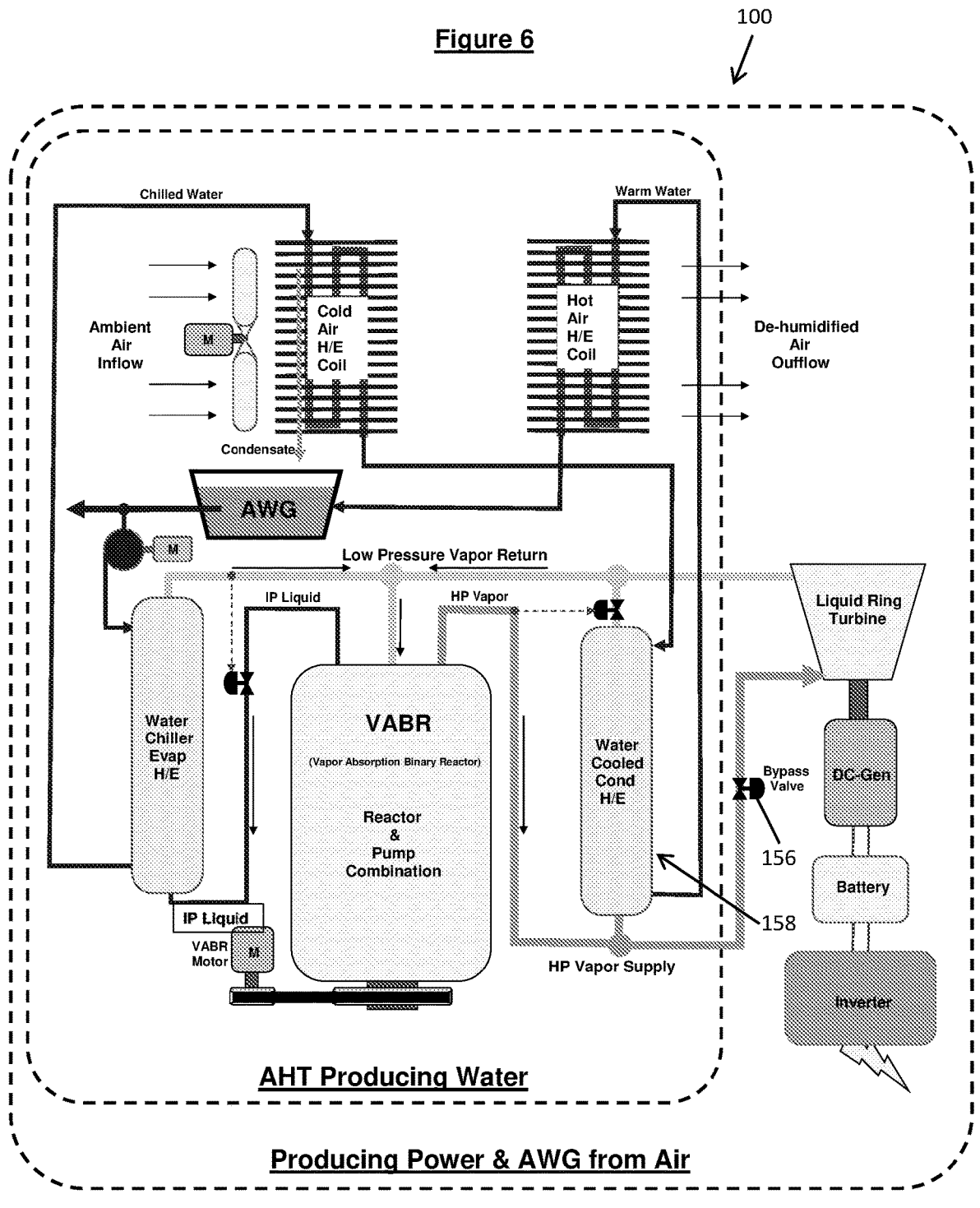
FIG. 6 shows a schematic process layout of another embodiment of generator for producing power and water from air.

(b) The waste heat outlet stream exiting the HP evaporator is also routed through a second air H/E (not shown) in the chilled, dried air flow path that exits the air-chilling H/E (150), to dissipate any residual excess heat present in the heat carrier liquid stream. (An arrangement of this kind, with a second air H/E, is shown in FIG. 6.) The two streams after flowing through the air heat exchangers are then combined and routed back to the reservoir (154) for recirculation as the input heat carrier water stream entering the AHT.

Thermal energy is therefore extracted from the air for powering the REHOS cycle.

In the current embodiment of generator operation, where the main focus is on water production from the chilled water output, power output from a turbine may be secondary. For this reason, a hot stream by-pass valve (156) and direct path to the reservoir (154) is provided to decrease the hot water mass flow through the HP evaporator and limit the power generated in the turbine to a required amount.

The centrifugal reactor and pump are integrated and combined into a single unit as in FIG. 3, but the turbine and generator are still separate units. This configuration would typically be used in the larger applications, for example an electrical output power greater than ~50 kWe. As the pressure differential across the turbine is fairly low (about 2-4 Bar only), it would be very practical to use a liquid piston expander for the power turbine. This would provide for further integration of the components.

In the description above, water is used as a high density intermediate heat carrier liquid medium for transferring heat from the hot absorber to an external HP evaporator to generate vapor that is used in an ORC. In a variation of the embodiments described the use of water as an intermediate heat transfer liquid may be omitted from the system.

To achieve this result, an alternative embodiment of VAB reactor is provided as shown in FIG. 5. The VAB reactor (106) is combined with an internal multistage pitot-type liquid pump (400) located above a centrifugal distillation section (110) with a peripheral absorption section (108). Unlike the absorber H/E shown in FIGS. 2 and 3, which use water as a carrier for heat removal, this embodiment routes NH3-rich liquid internally through the absorption section at the periphery of the centrifugal distillation section for transferring the heat in vapour form (as latent heat) from the VAB reactor to a turbine.

High concentration NH3 liquid is pumped directly through the NH3 inlet (410) within the reactor (106) to flash in the cooling coil of the absorber H/E (112) in the absorption section (108), removing heat in latent energy form to carry out to the ORC expander directly. In this embodiment of the invention, the evaporation function of the HP evaporator and the cooling function of the absorber H/E inside the absorption section are combined, so that no external HP evaporator is required.

The absorber H/E cooling coil (112) thus produces HP vapour that exits the VAB reactor at NH3 outlet (412) to drive the turbine directly (without an external HP evaporator or use of water as a heat carrier). The combined vapour from the turbine and LP evaporator enters the reactor (106) at the input line (303). The pitot pump (400) delivers low pressure binary liquid mixture through exit line (304) to an LP evaporator.

Figure 7:
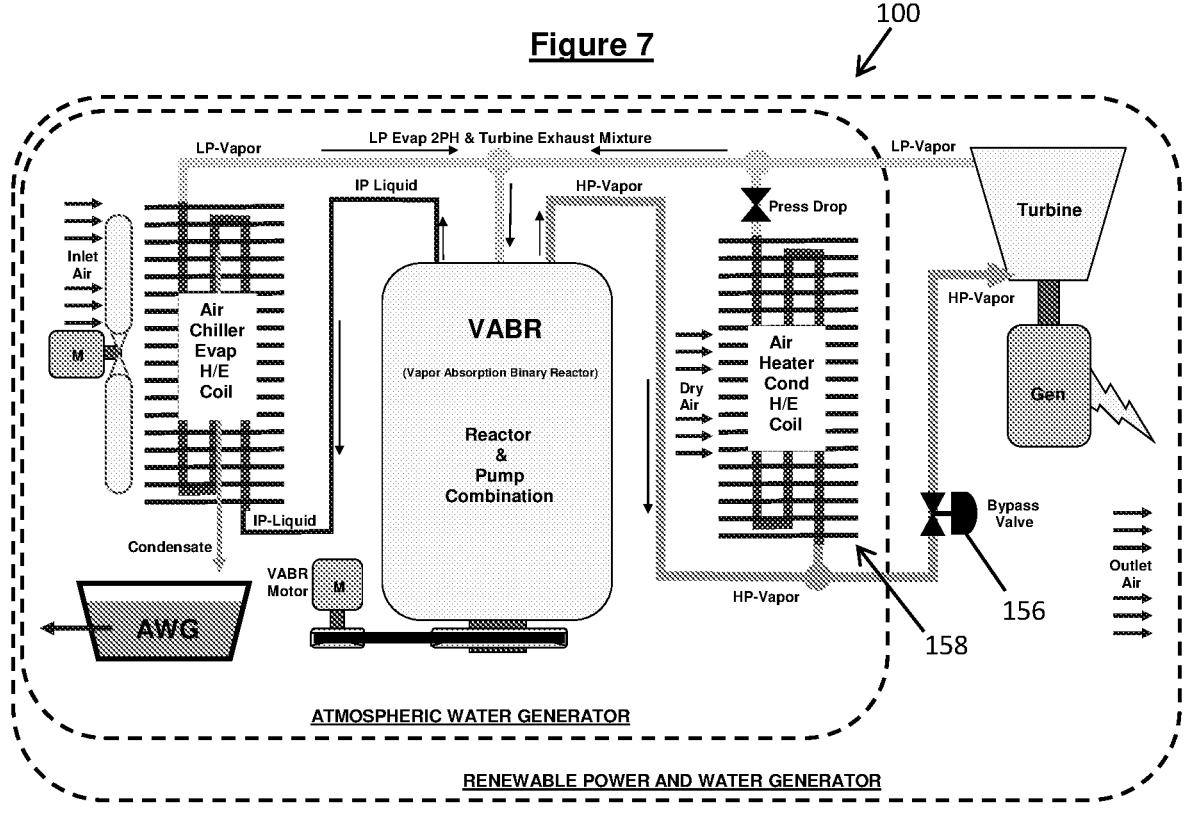
FIG. 7 shows a schematic process layout of a further embodiment of generator for extracting power and water from air.

The VAB reactor of FIG. 5 is used in the generators of FIGS. 6 and 7.

FIG. 6 shows a process layout diagram of a specific embodiment of the invention designed for thermal energy and water (AWG) extraction direct from the air.

In this embodiment:

Water is used as heat carrier medium, to distance the air H/E coils from the NH3 circuit. This feature serves to provide added safety, preventing NH3 contamination of AWG water by a leaking air H/E coil; and Liquid NH3 is used internally as a heat carrier to transfer the generated vapour absorption heat out of the absorber to the turbine.

The heat transfer between absorber and turbine carried in latent form by the HP vapour supply performs the HP evaporation function of the external/separate HP evaporator shown in FIGS. 1 and 4. This embodiment also shows how the steadily generated power may be stored in a battery and utilized as energy to deliver also high peaks of power for short periods (e.g. as required to boil water in a kettle) with a domestic inverter generating 220 Volt household electricity.

FIG. 7 shows a process layout diagram for an electricity generation embodiment that develops on the embodiment of FIG. 6 by using the internal NH3-H2O binary liquid mixture also as a heat carrier in an AWG air chiller evaporator H/E coil. The generator thus functions without the additional intermediary water heat carrier to interface to the air H/E as shown in FIG. 6.

Both the embodiments of FIGS. 6 and 7 employ a by-pass valve (156) when required to limit the power generated in the turbine. In both cases, the HP vapour is routed back to the VAB reactor through a heat exchanger (158) which uses water and air respectively to extract thermal energy.

Should the ambient air temperature be negative, for example −40° C. to 0° C., as typically encountered in an airplane flying at elevated altitude, heat may still be extracted from this low temperature air by using an adiabatic compression process to raise the air temperature above the required values for energy extraction in the LP evaporator operating at temperatures above zero. The resulting energy depleted compressed air leaving the cold air H/E should then also be expanded adiabatically in a power turbine to recover some of the air compression energy. The balance of compression energy would then be supplied by the RPW generator. This type of solution makes energy extraction from even very low temperature air possible, making the generator machine a practical power source for mobile applications, even in the aero-industry field.

Not only may this RPW generator be used for the utilization of ambient thermal energy for the generation of non-intermitted renewable electricity, but the favourable power to weight ratios achievable also renders the open cycle generator as a viable propulsion power source for the mobility industry, more specifically for the marine industry, drawing energy from the sea, lake or river. The closed cycle power from the air generator machines could ideally produce propulsion power for the road and rail transport sector, while higher power, but also higher speed smaller reactors used in the generator would be ideal for the aero-industry, providing electric propulsion from the thermal energy extracted from the air.

The invention has been described and illustrated in a manner that is largely suited for the manufacture of smaller units or machines for delivering a few kilowatts of electrical power. In such embodiments, the VAB reactor may preferably be a single component consisting of a peripheral absorber area or section as well as the packed bed distillation area and integrated into the same centrifuge body with a liquid pitot-type pump cascade.

For large implementations in the Megawatt electrical power output range that would typically be used by utility-scale power generation applications, the invention can be up-scaled as required with relative physical sizing of and changes in the arrangement of components for a given application.

Figure 8:
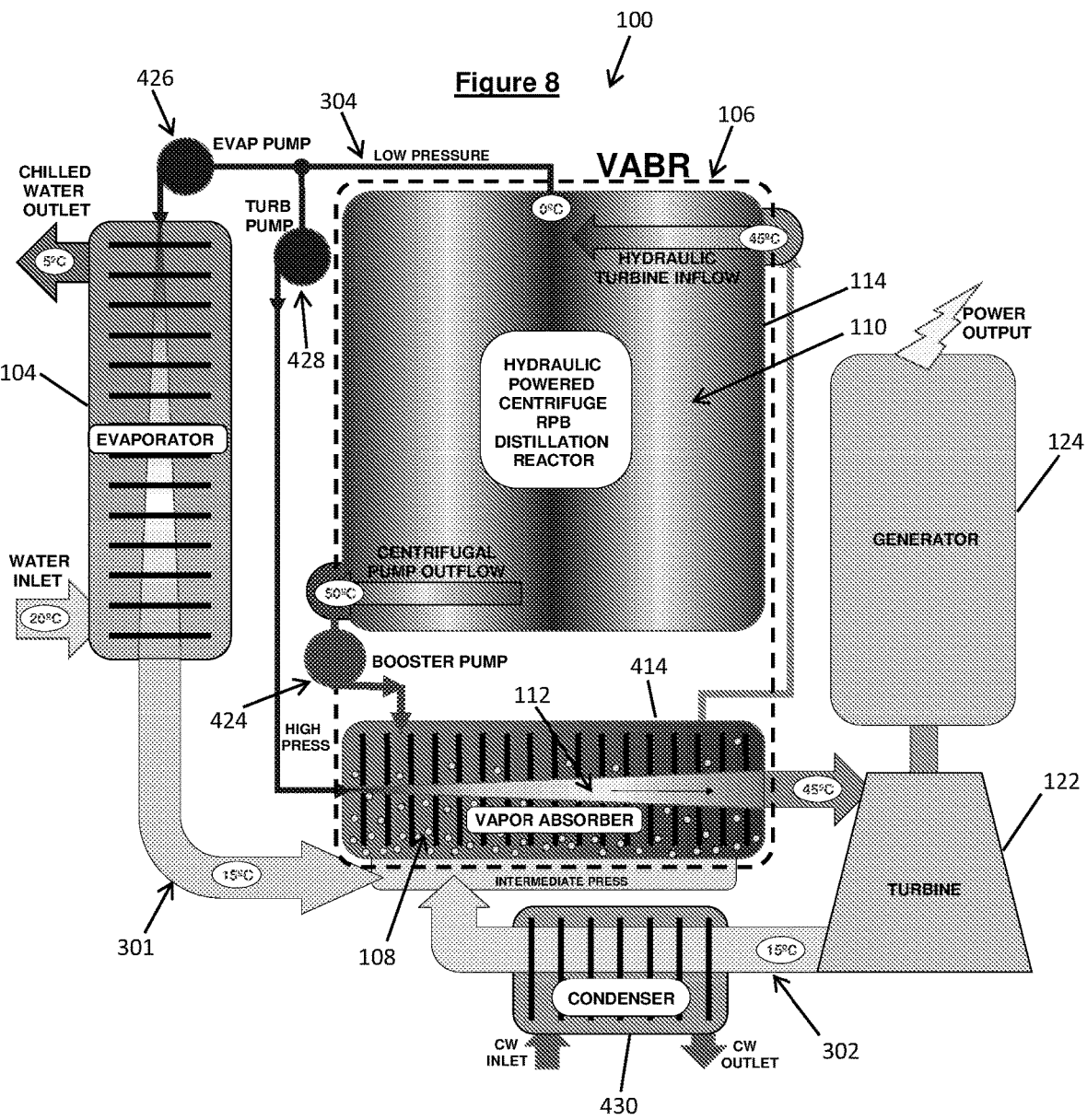
FIG. 8 shows a process layout of an open cycle water flow generator adapted for high-power applications.
Figure 9:
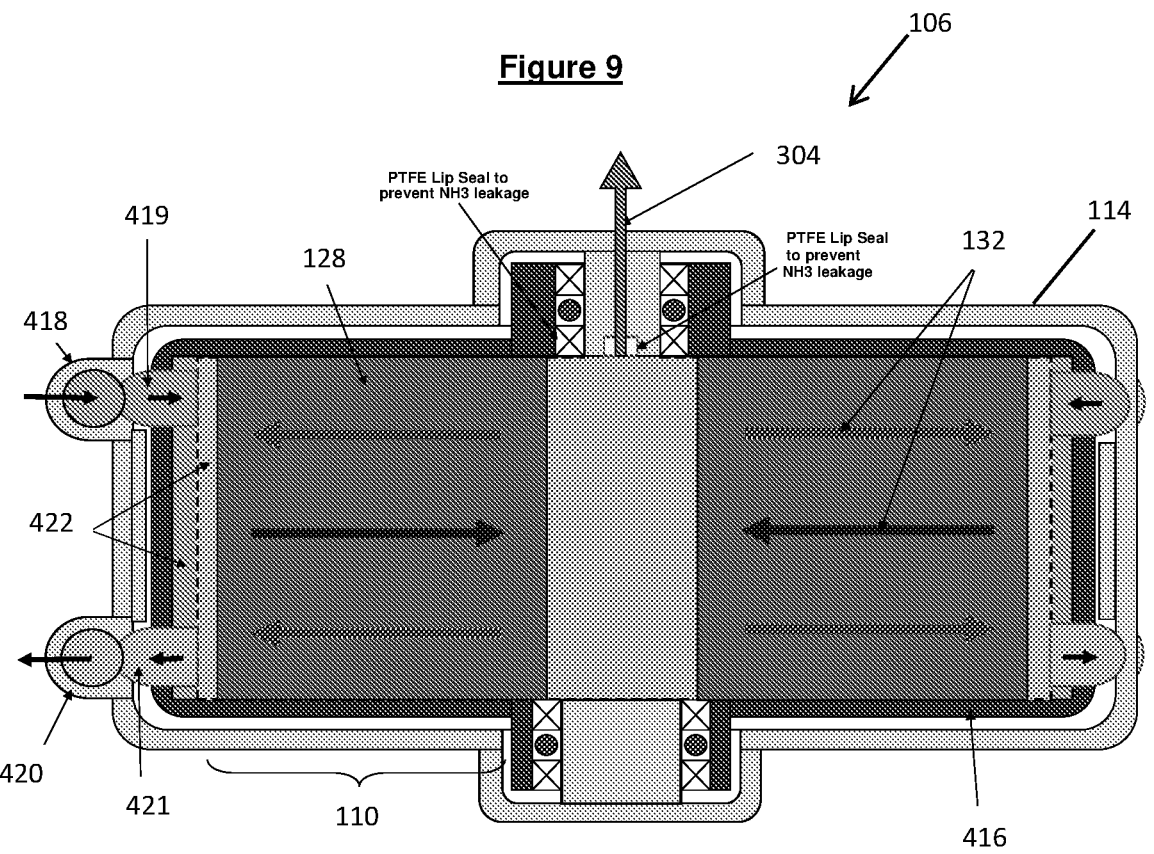
FIG. 9 shows a cross-section through a centrifugal distillation reactor for use with the process apparatus of FIG. 8.

Referring to FIG. 8, a process layout diagram of an open cycle water flow generator (100) adapted for high-power installations (e.g. in the megawatt range) is shown. The absorber H/E (112) is prohibitively large to meet the power requirement. In this embodiment only the essential VAB reactor distillation process is retained in a rotating centrifugal unit (114) described below. FIG. 9 shows a cross-section through a hydraulic powered RPB reactor (114) suited for high power delivery applications. The three system driving pumps as well as an absorber H/E unit (414) are provided as stationary equipment external to the centrifugal unit (114).

The distillation section (110) of the VAB reactor (106) is provided in the centrifugal unit (114) and the absorption section (108) is provided inside the absorber H/E unit (414) along with an internal absorber H/E (112). The centrifugal unit (114) includes a rotor body (416) with an arrangement of turbine pump blades (not shown) to displace the binary liquid mixture to the absorber H/E unit (414). The rotor body (416) is rotated at about 500-1000 RPM in this embodiment.

The turbine pump blades are arranged between an inlet scroll (418) and an outlet scroll (420) so as to provide the required rotation and liquid displacement. A suitable liquid inflow and outflow distribution structure (422) is provided between the scrolls (418; 420) and the rotating packed bed structure (128). The arrangement provides for a slightly colder lower density, higher % NH3 hydraulic turbine liquid inflow at (419) and a hot, high density low % NH3 centrifugal rotating outlet liquid at (421).

Heated, low concentration NH3 liquid is pumped out of the centrifugal unit (114) under action of pump blades at the periphery, to feed the external absorber H/E unit (414). A booster pump (424) adds pressure to the hot low concentration NH3 liquid, sub-cooling it to prepare for use in vapour absorption in the hot absorber H/E (112). Slightly cooled, higher concentration NH3 liquid enriched by the absorbed vapour in the absorption section (108), enters the centrifuge distillation section (110) into the hydraulic turbine radial inflow blading (preferably of the Francis turbine type). This converts some of the hydraulic pressure added by the booster pump (424) back into hydraulic kinetic energy, driving the rotation action of the centrifuge to run at a specific design speed. Speed control of the VABR high power centrifuge (114) is therefore achieved by controlling the output of the external booster pump.

A high concentration of NH3 distillate is drawn through an exit line (304) from the cold reactor centre to an LP evaporator pump (426) and a HP turbine pump (428). High concentration NH3 liquid is pumped through the absorber H/E (112) to the turbine (122). The combined vapour from the LP evaporator and turbine is returned to the external absorber H/E unit (414) via first and second return lines (301; 302). The second return line (302) from the turbine is provided with a condenser (430). Both the LP evaporator (104) and condenser (430) have a second side that is supplied with water (CW).

In this embodiment, it is estimated that up to 70-80% of the thermal energy absorbed by the LP evaporator is converted to power. The distillation rotor arrangement makes the compact high power (utility scale) embodiment of this invention as shown in FIG. 8 possible. Estimated temperatures within the cycle are indicated in the drawing.

Some of the important shared features of the embodiments of the invention can be summarised as follows:

(a) Use of an AHT, consisting of an evaporator and a VAB reactor, to extract thermal energy from an external heat source (e.g. waste heat or ambient temperature environmental heat direct from the environmental air or water);

(b) Use of the AHT as a heat pump to create a temperature gradient with both a hot outlet and a chilled outlet;

(c) Use of the temperature gradient to drive an ORC for the generation of power;

(d) Use of two different pressure levels, namely the LP evaporator pressure and the higher ORC turbine pressure. Some embodiments use two different pressure pumps to achieve this, while other embodiments only use one HP pump and a pressure reducing valve to drop the pressure level to the LP evaporator pressure requirement level;

(e) Generation of heat at the high temperature in the absorption process inside the absorber H/E that forms part of the VAB reactor.

(f) Use of a centrifugal distillation process for increasing the volatile component (NH3) concentration in the distillate outlet liquid to be used both in the LP evaporator and ORC power expander.

(g) All embodiments use the VAB reactor as a regenerative coupling component between the AHT and the ORC to achieve regeneration combined with an upgrade of low grade heat to a higher temperature than the ORC turbine HP operational temperature (by some 5-10° C., estimated for the examples). The VABR serves to upgrade low temperature heat (by lifting the temperature some 30° C.-40° C., estimated for the examples), allowing the regenerator output temperature to be higher than the ORC turbine inlet temperature. This renders the regenerative heat to also deliver a large percentage of HP evaporator evaporation energy and not only liquid heating energy (like the typical regenerative Rankine cycle used in power generation). This allows thermodynamic cycle efficiency to increase dramatically, rendering real values in excess of 50%, independent of the actual temperature values that the turbine operates between.

The high efficiency noted in the feature (g) allows a very high efficiency gain when implementing the invention.

The RPW generator, unlocking the global thermal energy reservoir of planet earth, can be used to supply electrical power, water from the local air, as well as air conditioning and refrigeration services in a renewable and environmentally friendly manner, producing zero emissions.

It will be appreciated that a number of variations may be made to the features of the embodiments described that will not depart from the scope of the invention as enabled and/or anticipated by the disclosure of this document.

The invention claimed is:

1. A power and/or water generator, comprising:

an absorption heat transformer (AHT) containing a binary liquid-vapour mixture and including:

a low pressure (LP) evaporator, and a vapour absorption binary (VAB) reactor;

the AHT configured to extract thermal energy from an external heat source and function as a heat pump creating a temperature gradient used to drive an Organic Rankine Cycle (ORC) that employs a high pressure (HP) vapour expansion drive mechanism for generation of power;

the VAB reactor including:

an absorption section, and a distillation section;

with an absorber heat exchanger (H/E) located inside the absorption section to draw heat from the absorption section;

the distillation section provided by a rotating centrifugal unit for increasing a volatile component concentration of the binary liquid-vapour mixture in a distillate outlet liquid to be used both in:

(a) the LP evaporator, and (b) a working vapour supply assembly for the vapour expansion drive mechanism;

the LP evaporator arranged for heat extraction from the external heat source, to receive distillate outlet liquid from the distillation section for conversion to LP evaporator vapour, and to supply the LP evaporator vapour through a first return line from the LP evaporator to the absorption section;

in which a heat carrier fluid medium is connected through a branch to the LP evaporator with a fluid medium chilling flow path on a first side of the LP evaporator that is isolated from and in thermal communication with a second side of the LP evaporator and a low pressure supply line for distillate outlet liquid from the distillation section connected to the second side of the LP evaporator for evaporation of the distillate outlet liquid and thermal energy extraction from the fluid medium in the fluid medium chilling flow path;

the absorption section generating heat in a vapour absorption process inside the absorption section;

the working vapour supply assembly incorporating the absorber H/E and arranged to use heat from the absorber H/E inside the absorption section for conversion of distillate outlet liquid from the distillation section to heated high pressure (HP) working vapour;

the HP working vapour supplied to the vapour expansion drive mechanism which is coupled to a generator; and LP exhaust vapour from the expansion drive mechanism connected through a second return line to the absorption section of the VAB reactor.

2. The generator as claimed in claim 1 wherein the absorption section and the distillation section are provided as parts of an integral component in the rotating centrifugal unit with the absorption section provided adjacent a periphery of the rotating centrifugal unit and the absorber H/E provided as a conduit that runs along the absorber section.

3. The generator as claimed in claim 2 wherein the conduit of the absorber H/E is a coil that runs around the distillation section within the absorber section.

4. The generator as claimed in claim 2 wherein the rotating centrifugal unit provides a rotating drive for an integrated pump that displaces the distillate outlet liquid, and the pump is a pitot-type pump with multiple pitot pipes provided as a multi-stage cascade arrangement.

5. The generator as claimed in claim 1 wherein the working vapour supply assembly comprises a high pressure (HP) supply line for distillate outlet liquid from the distillation section that is pumped through the absorber H/E to provide the HP working vapour supply to the vapour expansion drive mechanism.

6. The generator as claimed in claim 5 further comprising an HP working vapour supply line extending from the absorber H/E to the vapour expansion drive mechanism includes a by-pass return with a condenser heat exchanger (H/E) and a connection into the second return line to the absorber section of the VAB reactor, and for the by-pass return to include a pressure reducing valve.

7. The generator as claimed in claim 1 wherein the working vapour supply assembly comprises:

a supply line for a heat carrier fluid that is pumped through the absorber H/E where it is heated and delivered as heated absorber output heat carrier fluid to a first side of an HP evaporator for passage through a flow path that is isolated from and in thermal communication with a second side of the HP evaporator, and a high pressure supply line for distillate outlet liquid from the distillation section connected to a second side of the HP evaporator for thermal energy extraction from the heat carrier fluid in the flow path and evaporation of the distillate outlet liquid on the second side of the HP evaporator, wherein the HP working vapour is generated in the HP evaporator to provide HP vapour supply to the vapour expansion drive mechanism.

8. The generator as claimed in claim 7 wherein the absorber output heat carrier fluid flow path includes a by-pass away from the HP evaporator to provide a decrease in hot mass flow through the HP evaporator.

9. The generator as claimed in claim 1 wherein the fluid medium chilling flow path of the LP evaporator is connected to an air-chilling heat exchanger (H/E) for extraction of atmospheric water from air.

10. The generator as claimed in claim 9 wherein the heat carrier fluid medium is a high density liquid heat carrier in the form of environmental water that provides the external heat source.

11. The generator as claimed in claim 1 wherein the absorption section is provided as an absorber unit separate from and in fluid communication with the rotating centrifugal unit, the absorber H/E is a conduit that runs within the absorber unit and for:

a hot outlet from a heated periphery of the rotating centrifugal unit to be connected and pumped into the absorber unit; and an outlet from the absorber unit to be connected to the rotating centrifugal unit, a cold outlet from a low temperature centre of the rotating centrifugal unit to be connected to:

(a) an LP evaporator pump which feeds the LP evaporator, and (b) an HP absorber turbine pump which feeds the absorber H/E in the absorber unit, an outlet from the LP evaporator to be connected to the absorber unit, and an outlet from the absorber H/E to be connected to the vapour expansion drive mechanism.

12. The generator as claimed in claim 11 further comprising a booster pump is provided between the hot outlet from the rotating centrifugal unit and the absorber unit.

13. The generator as claimed in claim 12 wherein the rotating centrifugal unit includes a hydraulic powered rotating packed bed and rotor with hydraulic turbine blades driven by radial inflow from the first pump via the absorber unit.

14. The generator as claimed in claim 13 wherein heated, low volatile component concentration binary liquid is pumped out of the rotating centrifugal unit by the hydraulic turbine blades to feed the absorber unit via the first pump and for the booster pump.

15. The generator as claimed in claim 14 wherein pressure added by the booster pump serves to sub-cool the low volatile component concentration binary liquid providing higher volatile component concentration binary liquid after vapor absorption in the absorber unit.

16. The generator as claimed in claim 1 wherein the distillate outlet liquid from the rotating centrifugal unit is supplied through an LP evaporator pump to the LP evaporator and through an HP absorber turbine pump to the absorber H/E in the absorber unit.

17. A power and/or water generator, comprising:

an absorption heat transformer (AHT) containing a binary liquid-vapour mixture and including:

a low pressure (LP) evaporator, and a vapour absorption binary (VAB) reactor;

the AHT configured to extract thermal energy from an external heat source and function as a heat pump creating a temperature gradient used to drive an Organic Rankine Cycle (ORC) that employs a high pressure (HP) vapour expansion drive mechanism for generation of power;

the VAB reactor including:

n absorption section, and a distillation section;

with an absorber heat exchanger (H/E) located inside the absorption section to draw heat from the absorption section;

the distillation section provided by a rotating centrifugal unit for increasing a volatile component concentration of the binary liquid-vapour mixture in a distillate outlet liquid to be used both in:

(a) the LP evaporator, and (b) a working vapour supply assembly for the vapour expansion drive mechanism;

the LP evaporator arranged for heat extraction from the external heat source, to receive distillate outlet liquid from the distillation section for conversion to LP evaporator vapour, and to supply the LP evaporator vapour through a first return line from the LP evaporator to the absorption section;

in which ambient air provides the external heat source and is directed over a first side of the LP evaporator that is isolated from and in thermal communication with a second side of the LP evaporator with a low pressure supply line for distillate outlet liquid from the distillation section connected to the second side of the LP evaporator for evaporation of the distillate outlet liquid and thermal energy extraction from the ambient air providing an air-chilling heat exchanger (H/E) for extraction of atmospheric water from the ambient air;

the absorption section generating heat in a vapour absorption process inside the absorption section;

the working vapour supply assembly incorporating the absorber H/E and arranged to use heat from the absorber H/E inside the absorption section for conversion of distillate outlet liquid from the distillation section to heated high pressure (HP) working vapour;

the HP working vapour supplied to the vapour expansion drive mechanism which is coupled to a generator; and LP exhaust vapour from the expansion drive mechanism connected through a second return line to the absorption section of the VAB reactor.

* * * * *